United States Patent
Berends et al.

(12)

(10) Patent No.: US 6,506,258 B1
(45) Date of Patent: Jan. 14, 2003

(54) PROCESS FOR CONTROLLING SCALE IN THE SUGAR PROCESS

(75) Inventors: Robert Berends, Oudenbosch (NL); Hendrika Cornelia Kuzee, Oost Souburg (NL)

(73) Assignee: Cooperatie Cosun U.A., Roosendaal (NL)

( * ) Notice: Subject to any disclaimer, the term of this patent is extended or adjusted under 35 U.S.C. 154(b) by 0 days.

(21) Appl. No.: 09/622,477

(22) PCT Filed: Feb. 22, 1999

(86) PCT No.: PCT/NL99/00093

§ 371 (c)(1), (2), (4) Date: Dec. 5, 2000

(87) PCT Pub. No.: WO99/42410

PCT Pub. Date: Aug. 26, 1999

(30) Foreign Application Priority Data

Feb. 20, 1998 (NL) .............................................. 1008371

(51) Int. Cl.$^7$ .............................. C02F 5/10; C13F 1/00; B01D 19/04
(52) U.S. Cl. ............ 127/61; 159/DIG. 4; 159/DIG. 13; 210/698; 252/180; 516/132
(58) Field of Search .......................... 252/180; 516/132; 127/61; 210/698; 159/DIG. 4, DIG. 13

(56) References Cited

U.S. PATENT DOCUMENTS

| 2,311,008 A | * | 2/1943 | Tucker ........................ 210/698 |
| 2,868,724 A | * | 1/1959 | Zech ........................... 210/698 |
| 3,061,478 A | * | 10/1962 | Kent ............................ 127/61 |
| 3,483,033 A | * | 12/1969 | Casey ........................... 127/61 |
| 3,696,044 A | * | 10/1972 | Rutledge ................ 210/698 X |
| 4,000,127 A | * | 12/1976 | Cornelissens et al. .. 252/180 X |
| 4,389,324 A | * | 6/1983 | Keller ......................... 252/180 |
| 4,452,703 A | * | 6/1984 | Ralston et al. .............. 210/698 |

FOREIGN PATENT DOCUMENTS

| WO | WO95/15984 | * | 6/1995 |
| WO | WO9825972 | | 6/1998 |

* cited by examiner

*Primary Examiner*—Richard D. Lovering
(74) *Attorney, Agent, or Firm*—Young & Thompson

(57) ABSTRACT

The deposition of calcium salts, including calcium carbonate and calcium oxalate and the formation of foam, during the evaporation of sugar streams can be prevented or restricted by ding 0.1–200 ppm of a carboxyalkylfructan that contains 0.5–3 carboxyl groups per monosaccharide unit, 0.4–2.5 of which carboxyl groups are in the form of carboxyalkyl groups, to the sugar streams. The carboxyalkyl groups are, in particular, carboxymethyl groups. The other carboxyl groups can be carboxyl groups obtained by oxidation.

9 Claims, 1 Drawing Sheet

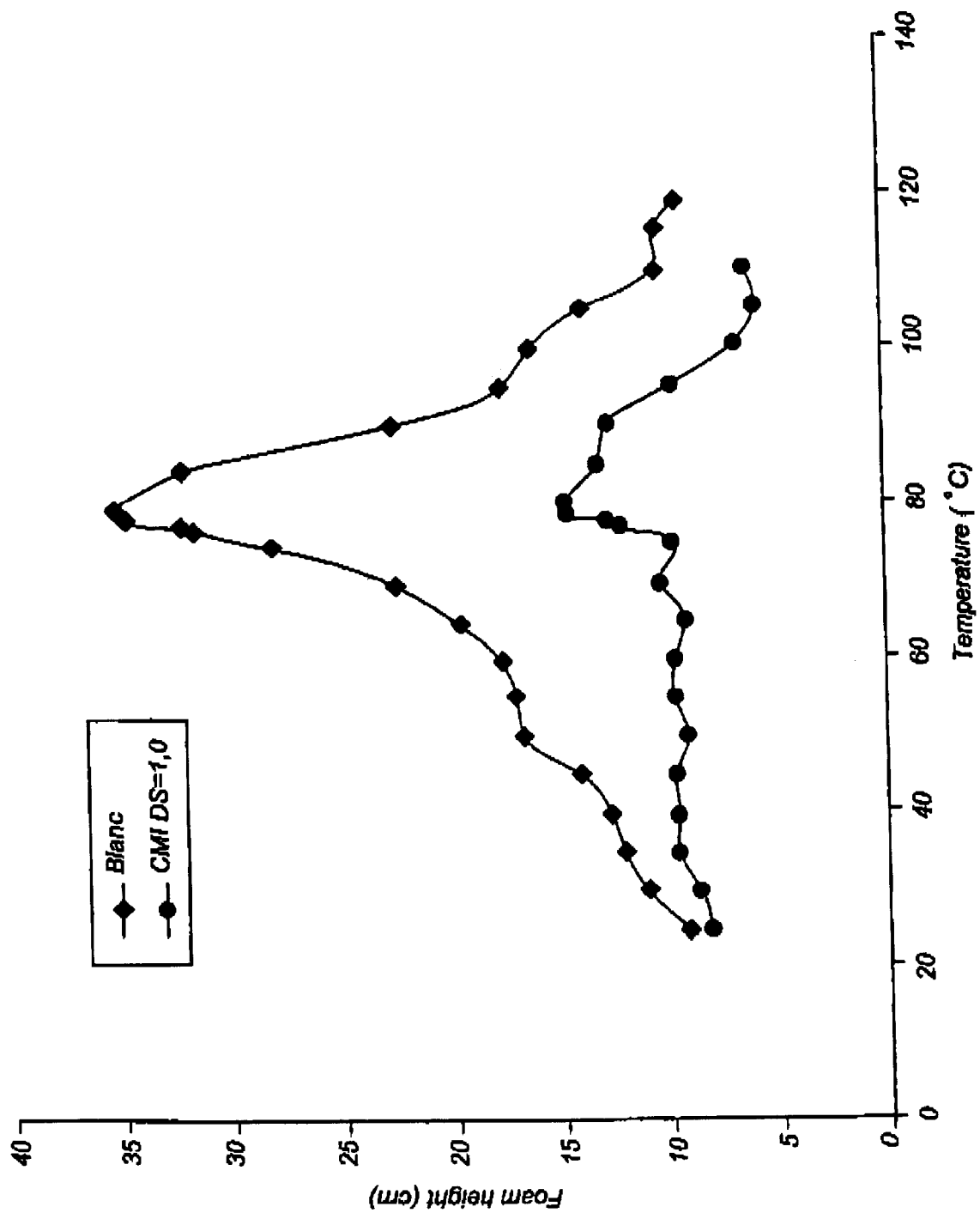

PROCESS FOR CONTROLLING SCALE IN THE SUGAR PROCESS

This application is a 371 of PCT/NL99/00093 filed Feb. 22, 1999.

BACKGROUND OF THE INVENTION

The invention relates to a process for controlling the deposition of, in particular, calcium salts during the evaporation of sugar streams.

In sugar production deposition of calcium salts ("scale") takes place during evaporation, Said scale consists of fluctuating mixtures of calcium carbonate, calcium oxalate, calcium phosphate, silicates and organic substances and occurs both in the sugar beet and the sugar cane industry. The consequence of this scale is that heat exchange proceeds less well, with a reduction in the efficiency of the evaporation as a result. In the past, the calcium scale therefore had to be removed by mechanical cleaning means or by acid or alkaline cleaning agents at the end of the sugar campaign. These procedures are labour-intensive and give rise to corrosion.

Various agents, in particular polycarboxylic acids and polyphosphonic acids and mixtures thereof, have been proposed to prevent calcium scale when concentrating sugar streams. Examples are a mixture of polyacrylic acid and sodium hexametaphosphate U.S. Pat. No. 3,483,033), partially hydrolysed polyacrylamide (U.S. Pat. No. 4,072,607), polymaleic acid (U.S. Pat. No. 4,452,703) and nitrilotrismethylphosphonic acid (NL 89165) and a mixture of copolymers based on acrylic acid and the like (EP 11 743). In practice polyacrylates are frequently used to prevent deposition of calcium salts during the sugar evaporation process. However, polyacrylate and the other proposed scale inhibitors have the disadvantage that solutions thereof have a relatively high viscosity and consequently do not mix readily with the sugar stream, whilst dilution of the sugar stream, to improve mixing is undesirable, inter alia because of the resultant higher energy consumption. Furthermore, polyacrylate is a synthetic polymer and acrylic acid, the monomer thereof, which is toxic to some extent, is inevitably present in the solutions. In connection with this, stringent requirements are imposed on the quantity of polyacrylates that may be used for this application. According to the, FDA, the maximum concentration of polyacrylate is 3.6 ppm on unrefined juice. Furthermore, when polyacrylates and the like are used, an anti-foam is needed for the control of foam which is produced as a consequence of the presence of proteins, betaine and saponins in the sugar stream.

No serious alternatives to polyacrylates as scale inhibitors in the sugar process have been reported thus far. A glycerol-based antiscaling agent was found to be ineffective in sugar factory evaporators (Majalah Penilitian Gula 32 (1996) 28–34).

SUMMARY OF THE INVENTION

It has now been found that carboxymethylinulin (CMI) and other carboxyalkylfructans are an alternative for polyacrylates which work well in the control of the deposition of calcium salt and other scale, such as deposits of magnesium salts, silicates and organic material, during evaporation in the sugar process. The scale-inhibiting action of CMI is comparable with or even better than that of polyacrylates, whilst CMI is biodegradable and non-toxic. Moreover, CMI can be dissolved in any desired ratio in the sugar stream without dilution, and does not affect the crystallisation of sucrose. Surprisingly, it has also been found that when CMI is used as scale-inhibiting agent, less or even no anti-foam has to be added to control troublesome foam that can be produced during and after the evaporation process. A further advantage is that, in contrast to polyacrylates, the CMI that passes into the molasses following sugar separation does not interfere with the fermentation of the molasses (to produce, for example, alcohol ad citric acid) and if it then passes via the residual stream into the vinasse it in no way prohibits the use of the latter as, for example, cattle feed.

BRIEF DESCRIPTION OF THE DRAWING

The FIGURE is a graph of foam height at various temperatures.

DESCRIPTION OF THE PREFERRED EMBODIMENTS

It is rather suprising that carboxymethyl inulin is an effective antiscaling agent in the sugar process, as it is know that oligosaccharides such as raffinose have an adverse effect on the crystallisation of sucrose (Vaccari et al., Sugar Technol. Reviews 13 (1986), 133–178).

In this context fructans are understood to be all oligosaccharides and polysaccharides which have a majority of anhydrofructose units. The fructans can have a polydisperse chain length distribution and can be straight-chain or branched. The fructan can contain mainly β-2,6 bonds, as in levan. Preferably, the fructan contains mainly β-2,1 bonds, as in inulin.

In this context, carboxymethylfructan or carboxymethylinulin (CMI) is understood to be a derivative of inulin or another fructan that contains 0.5–3 carboxyl groups per anhydrofructose unit, at least 0.4 of these carboxyl groups being in the form of carboxymethyl groups obtained by substitution of hydroxyl groups in the fructan. In particular the derivative contains at least 0.8 carboxyl groups per anhydrofructose unit, 0.7–2.5 carboxyl groups of which are in the form of carboxymethyl groups. Preferably, the number of carboxymethyl groups is greater than the number of other carboxyl groups. The other carboxyl groups can be present in the form of carboxyl groups obtained by oxidation of hydroxymethyl and/or hydroxymethylene groups. Other carboxyalkyl groups, such as carboxyethyl, dicarboxymethyl or carboxyethoxycarbonyl groups, can be present instead of carboxymethyl groups.

Carboxymethylinulin having a DS of 0.15–2.5 is disclosed in WO 95/15984 and in the article by Verraest et al. in *JAOCS*, 73 (1996), pp 55–62. It is prepared by reaction of a concentrated solution of inulin with sodium chloroacetate at elevated temperature. Carboxyethylinulin is disclosed in WO 96/34017. The oxidation of inulin is disclosed, for example, in WO 91/17189 and WO 95/12619 (C3–C4 oxidation) and WO 95/07303 (C6 oxidation). In the case of mixed carboxyl derivatives, the inulin can first have been carboxymethylated and then oxidised or (preferably) first oxidised and then carboxymethylated.

The carboxyalkylfructan has an average chain length (=degree of polymerisation, DP) of at least 3, ring to about 1,000. Preferably, the average chain length is 6–60 monosaccharide units. The fructan can optionally have been subjected to a reduction treatment beforehand, in order to remove reducing groups.

Modified fructan derivatives which can be converted to carboxyalkylfructan according to the invention are, for example, fructans having a chain length that has been increased enzymatically and fructan hydrolysis products, that is to say fructan derivatives having a shortened chair and fractionated products having a modified chain length. Fractionation of fructans such as inulin can be effected by, for example, low temperature crystallisation (see WO 94/01849), column chromatography (see WO 94/12541), membrane filtration (see EP-A 440 074 and EP-A 627 490) or selective precipitation with alcohol. Prior hydrolysis to give shorter fructans can be effected, for example, enzymatically (endo-inulinase), chemically (water and acid) or by heterogeneous catalysis (acid column). Hydroxyalkylated and/or cross-linked fructans can also be used in the method according to the invention following carboxyalkylation and, optionally, oxidation.

The carboxymethylfructan can be used in the form of the purified substance, but use can also be made of the industrial grade product obtained directly by carboxymethylation. Specifically, it has been found that any impurities, such as glycolic acid and diglycolic acid, do not have any adverse effects on the action of the CMI. Use can be made of the free acid, but it is also possible to use a salt, such as the sodium, potassium or ammonium salt.

The concentration of carboxyalkylfructan, in particular CMI, in the sugar stream is in general between 0.1 and 200 ppm (parts by weight) and in particular between 2 and 50 ppm. It is also possible to use mixtures of the carboxyalkylfructan and other scale inhibitors, such as polyacrylates or phosphonates, preferably in a ratio of at least 1 part carboxyalkylfructan to 1 part other agent.

EXAMPLES

Example 1

The scale-inhibiting action of CMI was determined for calcium carbonate. In accordance with the procedure followed, 1 mg/l or 5 mg/l inhibitor was added to a saturated calcium carbonate solution. The solution was prepared by mixing a calcium chloride solution with a sodium carbonate solution with a maximum amount of calcium carbonate to be formed of 95 mg/l. The pH of the solution was adjusted to 10.0 and the solution was then put aside, with shaking, at 75° C. After 20 hours the solution was filtered through a Whiteband filter and the calcium content of the filtrate was determined. The effect of the inhibitor was calculated on the basis of the calcium value for the experiment without inhibitor (0% inhibition) and the calcium value at which no precipitate was formed (100% inhibition). This gave the results as shown in Table 1.

TABLE 1

Results of calcium carbonate inhibition

| Product | Inhibition (%) | |
|---|---|---|
| | Dose 1 mg/l | Dose 5 mg/l |
| CMI DS = 1.0 | 88 | 100 |
| CMI DS = 2.0 | 27 | 100 |
| Polyacrylate (mol. wt 2,300) | 60 | 100 |

Example 2

The scale-inhibiting action of CMI was determined for calcium oxalate. In accordance with the procedure followed, 2 mg/l or 4 mg/l inhibitor was added to a saturated calcium oxalate solution. The solution was prepared by mixing a calcium chloride solution with an oxalic acid solution with a maximum amount of calcium oxalate to be formed of 28 mg/l. The pH of the solution was adjusted to 10.0 and the solution was then put aside, with shaking, at 75° C. After 20 hours the solution was filtered through a Whiteband filter and the calcium content of the filtrate was determined. The effect of The inhibitor was calculated on the basis of the calcium value of the experiment without inhibitor (0% inhibition) and the calcium value at which no precipitate was formed (100% inhibition). This gave the results as shown in Table 2.

TABLE 2

Results of calcium oxaiate inhibition

| Product | Inhibition (%) | |
|---|---|---|
| | Dose 2 mg/l | Dose 4 mg/l |
| CMI DS = 1.0 | 84 | 72 |
| CMI DS = 2.0 | 60 | 68 |
| Polyacrylate (mol. wt 2,300) | 62 | 62 |

Example 3

In the 1997 campaign, industrial grade CMI having a DS of 1.0 was tested against a commercially available polyacrylate (mol. wt 2,300) in the evaporation over a period of 8 days. The evaporation consists of two identical production lines connected in parallel, each comprising 7 evaporator bodies (of the Robert and falling film type). In this evaporation the thin (clarified) juice is concentrated from 15 to 75% solids. The volume flow is 375–425 $m^3/h$ per production line, corresponding to a sugar production of 2,700 tonne/day. The juice temperature falls from 140 to 90° C. During the evaporation as a consequence of a reduction in pressure. CMI was metered in comparable concentrations (total 4 ppm active material) to the first and third step of the evaporation (each 2 ppm active material). The results obtained, determined as calcium carbonate concentration upstream and downstream of the evaporation and thermoresistance ($W/m^2K$), were comparable with the polyacrylate used up to that time. It was striking that when CMI was used it was possible to reduce the consumption of anti-foam (for example Structol®) from 2.5 to 0.5 l/h. No defects in the evaporators as far as scale formation was concerned were found following the campaign.

Example 4

During the entire 1998 campaign industrial grade CMI having a DS of 1.0 was tested against a commercially available polyacrylate (mol. wt=2,300) in the evaporation. The evaporation consists of two identical production lines connected in parallel, each comprising 7 evaporator bodies (of the Robert and falling film type). In this evaporation the thin (clarified) juice is concentrated from 15 to 75% solids, The average volume flow is 400 $m^3/h$ per production line, corresponding to a sugar production of 2,700 tonne/day. The juice temperature falls from 140 to 90° C. during the evaporation as a consequence of a reduction in pressure. The pH of the thin juice is 9. During the entire campaign CMI was metered in comparable concentrations (total 4 ppm active material) to the first and third step of the evaporation (each 2 ppm active material). The average calcium content of the thin juice is 125 mg/kg solids. The calcium content of the thick juice treated with CMI is 130 mg/kg and for the commercial product 131 mg/kg. On visual inspection the evaporator treated with CMI did not show any calcium scale. No cleaning of the system was needed.

Example 5

The anti-foam activity of CMI was determined. As much industrial grade CMI with a DS of 1.0 was added to 2 l of fresh thin (clarified) juice that the active content of CMI was 3.6 ppm. Then the solution was transferred to a foam testing apparatus (manufactured by Labotel). In this apparatus the solution was pumped around over a heat exchanger. The thin (clarified) juice was heated in two phases from room temperature to 120° C. The first phase from room temperature to 80° C. was carried out under atmospheric conditions. From 80 to 120° C. in a closed system, i.e. under pressure forming. The height of the amount of formed foam was measured continuously. The results are shown in the FIGURE. In the FIGURE the upper line represents the blanc, i.e. the juice without CMI, and the lower line represents the test, i.e. juice with 3.6 ppm of CMI.

What is claimed is:

1. A process for the prevention and/or control of the deposition of scale and/or the control of foaming during the evaporation of sugar streams using a polycarboxy compound, characterised in that a carboxyalkylfructan that contains 0.5–3 carboxyl groups per monosaccharide unit, at least 0.4 of which carboxyl groups is in the form of carboxyalkyl groups, is incorporated in the sugar stream.

2. A process according to claim 1, wherein a carboxyalkylfructan is incorporated at a concentration of 0.1–200 ppm.

3. A process according to claim 2, wherein the concentration is 2–50 ppm.

4. A process according to claim 1, wherein the carboxyalkylfructan contains at least 0.8 carboxyl group per monosaccharide unit.

5. A process according to claim 1, wherein the carboxyalkylfructan contains 0.7–2.5 carboxyethyl groups per monosaccharide unit.

6. A process according to claim 1, wherein the carboxyalkylfructan is a carboxyalkylinulin having an average degree of polymerisation of 6–60.

7. A process according to claim 1, wherein the scale comprises calcium salts.

8. A process according to claim 1, wherein a product obtained directly by carboxyalkylation of fructan is used.

9. A process according to claim 1, wherein a purified carboxyalkylfructan is used.

* * * * *